United States Patent

Bourgeois

[11] 4,013,167
[45] Mar. 22, 1977

[54] CONVEYOR SUPPORT STRUCTURE

[75] Inventor: Ronald D. Bourgeois, Waltham, Mass.

[73] Assignee: Custom Fabricators, Inc., Waltham, Mass.

[22] Filed: May 21, 1975

[21] Appl. No.: 579,320

[52] U.S. Cl. .............................................. 198/861
[51] Int. Cl.$^2$ ....................................... B65G 15/60
[58] Field of Search .............. 198/204, 127 R, 193, 198/208, 861; 308/189 R

[56] References Cited

UNITED STATES PATENTS

| | | | |
|---|---|---|---|
| 1,357,256 | 11/1920 | Sargent | 198/193 |
| 2,712,377 | 7/1955 | Eggleston | 198/127 R |
| 2,747,725 | 5/1956 | Hatch et al. | 198/204 X |
| 3,018,875 | 1/1962 | Greenberger | 198/208 |
| 3,605,994 | 9/1971 | Parlette | 198/204 |

FOREIGN PATENTS OR APPLICATIONS

| | | | |
|---|---|---|---|
| 918,494 | 8/1954 | Germany | 198/204 |
| 552,471 | 4/1943 | United Kingdom | 198/204 |

*Primary Examiner*—Evon C. Blunk
*Assistant Examiner*—Douglas D. Watts
*Attorney, Agent, or Firm*—Joseph S. Iandiorio

[57] ABSTRACT

A conveyor system support structure including first and second monolithic longitudinally corrugated side support members; and transverse support means including a transverse support member for interconnecting the side support members in spaced relation; each of the side support members including a positive corrugation including an inwardly disposed element for receiving a transverse support member for interconnecting the side support members and for receiving roller means in static and dynamic conveyors and defining in conjunction with interconnection elements common to that positive corrugation and adjacent negative corrugations, an outwardly concave recess for housing means for securing the roller means and means for securing the transverse support members, and a negative corrugation providing an inwardly concave recess for receiving the edges of conveyor belting means in a dynamic conveyor and including an outwardly disposed element for laterally guiding conveyor belting means, and a first bearing surface on an interconnection element for slidably supporting the edge of the conveyor belting means.

3 Claims, 21 Drawing Figures

CONVEYOR SUPPORT STRUCTURE

FIELD OF INVENTION

This invention relates to a monolithic, longitudinally corrugated, side support structure for static and dynamic conveyor systems.

BACKGROUND OF INVENTION

There are at least two general types of conveyors; static i.e. rollers rotate to drive the goods along but do not themselves move; dynamic i.e. a belt moves carrying the goods with it. Rollers may also be used in dynamic systems to drive and/or support the belt but are not the conveying mechanism in this type of conveyor. There are a number of problematic areas with these conveyors. One such area relates to the use of various drive mechanisms and support structures which are accessible to the conveyed goods and which establish voids, corners and other places where the goods or particles of goods can become lodged. This is especially problematic when the goods are small and can become damaged themselves or can become enmeshed, alone or in an accumulation, with the drive apparatus and cause it to bind or be damaged. This problem is magnified in the food processing industry where the goods can decay and form harmful substances. In such applications elaborate, frequent washings and immersions of the entire conveyor system are often necessary to ensure sanitary conditions.

Generally there is provided specific guiding and support means for belted conveyors and the various support structures and drive apparatus are disposed wholly, or extend at least partially externally to the sides of the conveyor. This increases the space required for such conveyors and the hazards associated with working near them.

Rollers used in conveyor systems either as the primary conveying mechanism or the drive and/or support means for belting are generally of the type in which one end shaft is retractable to permit installation of a roller having a length approaching as nearly as possible the distance between the side supports for the rollers and to minimize the enlargment of the shaft hole required to enable installation. Such rollers with retractable mechanisms are expensive but are typically preferred to the alternative approach which requires a much enlarged shaft hole and a roller whose length is significantly less than the distance between the side support members.

Tension adjusting means such as used with belted conveyor systems require substantial support and guide structures to vary and to maintain tension settings on heavily loaded conveyors.

SUMMARY OF INVENTION

It is therefore an object of this invention to provide an improved, simple, inexpensive and sanitary side support member for static and dynamic conveyor systems.

It is a further object of this invention to provide such a side support member which virtually eliminates voids, corners, and other places where particles of goods or goods being conveyed can accumulate.

It is a further object of this invention to provide such a side support member which reduces the likelihood of goods or particles of goods being enmeshed in the drive apparatus to the detriment of the goods and/or the drive apparatus.

It is a further object of this invention to provide such a side support member which is extremely easy to clean and to keep clean and is virtually leak-proof.

It is a further object of this invention to provide such a side support member which guides and supports the belting in dynamic conveyors.

It is a further object of this invention to provide such a side support member which has tight, leak-proof mountings for rollers in static and dynamic conveyors.

It is a further object of this invention to provide such a side support member for the housing of the mountings and fasteners for the ends of rollers and transverse support members and for housing drive elements integral with or separate but associated with belting within the confines of the side support members.

It is a further object of this invention to provide such a side support member which enables the use of extremely small shaft mounting holes even for fixed shaft rollers.

It is a further object of this invention to provide such a side support member which enables the use of fixed shaft rollers whose length approaches extremely closely the distance between the side support structures.

It is a further object of this invention to provide such a side support member with an improved, simple inexpensive, and sturdy tension adjustment mechanism.

The invention features a conveyor system support structure having first and second monolithic, longitudinally corrugated, side support members and transverse support means including a transverse support member for interconnecting the side support members in spaced relation. Each of the side support members includes a positive corrugation including an inwardly disposed element for receiving a transverse support member for interconnecting the side support members and for receiving roller means in static and dynamic conveyors. Each positive corrugation defines, in conjunction with interconnection elements common to that positive corrugation and adjacent negative corrugations, an outwardly concave recess for housing means for securing the roller means and means for securing the transverse support members. Each negative corrugation provides an inwardly concave recess for receiving the edges of conveyor belting means in a dynamic conveyor and includes an outwardly disposed element for laterally guiding conveyor belting means. Each negative corrugation also includes a first bearing surface on an interconnection element for slidably supporting the edge of conveyor belting means.

The invention results from the realization that a sanitary, virtually leakless side support structure for both static and dynamic conveyors could be provided which eliminates voids and cracks, prevents interaction of goods and drive apparatus, provides guides and supports for belting in dynamic conveyors and easier and tighter installation of optimum size rollers in static and dynamic conveyors, a simpler and sturdier tension adjusting mechanism and recessed mounting areas, all simply by using monolithic, longitudinally corrugated, side support members.

DISCLOSURE OF PREFERRED EMBODIMENT

Other objects, features and advantages will occur from the following description of a preferred embodiment and the accompanying drawings, in which:

FIG. 14A, B and C depict a three step installation procedure for fixed shaft roller in a prior art conveyor system;

FIG. 15A, B and C depict a three step installation procedure for a fixed shaft roller in a conveyor system according to this invention.

The invention may be accomplished using a conveyor system support structure which includes first and second monolithic, longitudinally corrugated, side support members and transverse support means including one or more transverse support members which interconnect the side support members in spaced relation. Each of the side support members includes a positive corrugation which includes an inwardly disposed element for receiving transverse support members and for receiving roller means; roller means may be the primary conveying mechanism in a static conveyor system in which the rollers rotate but do not move along the direction of the conveyor. Rollers may also be used in a dynamic conveyor system in which belting moves to convey the goods and the rollers act to drive and/or support the belting. Each side support member also includes one or more negative corrugations, each of which includes an outwardly disposed element which provides lateral guidance for belting in dynamic conveyor systems.

Between the outwardly disposed elements of the negative corrugation and the inwardly disposed elements of the positive corrugations are interconnection elements: each adjacent pair of positive and negative corrugations has in common one interconnection element. The surface of the interconnection element in the negative corrugation consists only of an outwardly disposed element and one interconnection element in common with the positive corrugation: for without second and third positive corrugations adjacent the other sides of the negative corrugations there is no need for the common interconnection elements. The inwardly concave recess formed by the negative corrugations may be used to house an internal drive element associated with one edge of belting means so that the drive element is snugly and slidably received in the concave recess of the negative corrugation between a first bearing surface on one interconnection element and a second bearing surface on the second interconnection element of the negative corrugation. When the means for securing the roller means includes a drive member such as a gear or the like for engaging an external drive element, the external drive element may be housed in the outwardly concave recess formed by the positive corrugation.

Each side support member may include a plurality of corrugations for implementing multilayer conveyor systems used either as hold down systems or as multiple conveyor systems. In addition the side support member may include a plurality of corrugations extending above a conveyor to act as guide walls to prevent tipping of the conveyed objects.

The means for securing the roller means includes a hole in the inwardly disposed element of the positive corrugation for receiving a shaft of the roller means and a rotary bearing mechanism housed in the outwardly concave recess and fixed to the inwardly disposed element for receiving the shaft. The interconnection elements defining the outwardly concave recess may snugly and firmly engage the rotary bearing mechanism and confine it against movement in the first dimension. The inwardly disposed element may contain a pair of spaced detents for firmly and snugly engaging the rotary bearing mechanism and confining it against movement in a second dimension transverse to the first.

Alternatively, the means for securing the roller may include a hole in the inwardly disposed element for receiving the shaft of the roller means and a bearing housing, housed in the outwardly concave recess, fixed to the inwardly disposed element and aligned with the hole, and a rotary bearing mechanism in the bearing housing for receiving the shaft.

A tension adjustment mechanism includes a corrugated plate for snugly nesting in and being slidably guided by the corrugation of one of the side support members. A reference member fixed to the side support member and interconnected with the plate by an interconnection means adjusts the distance therebetween.

Figure 1:
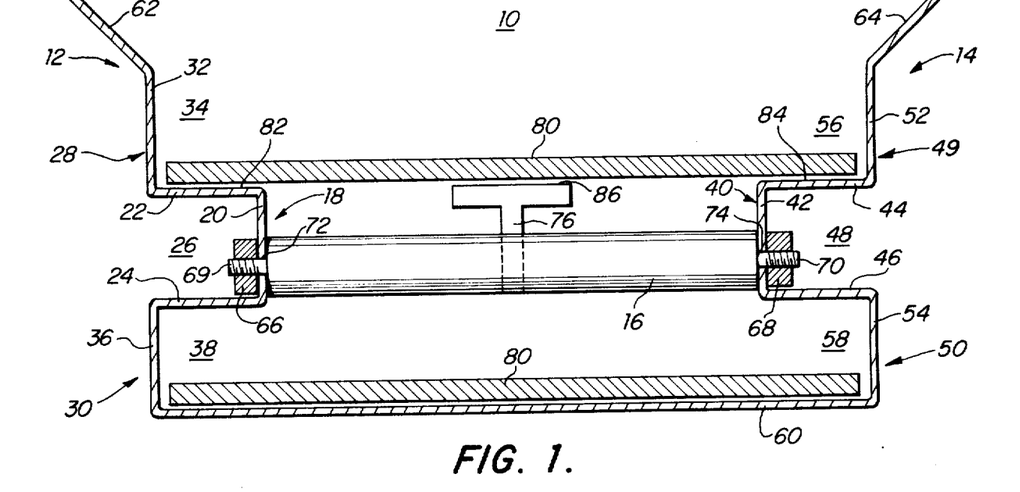
FIG. 1 is a diagrammatic, cross-sectional view of a portion of a dynamic conveyor system having side support structures according to this invention.
Figure 2:
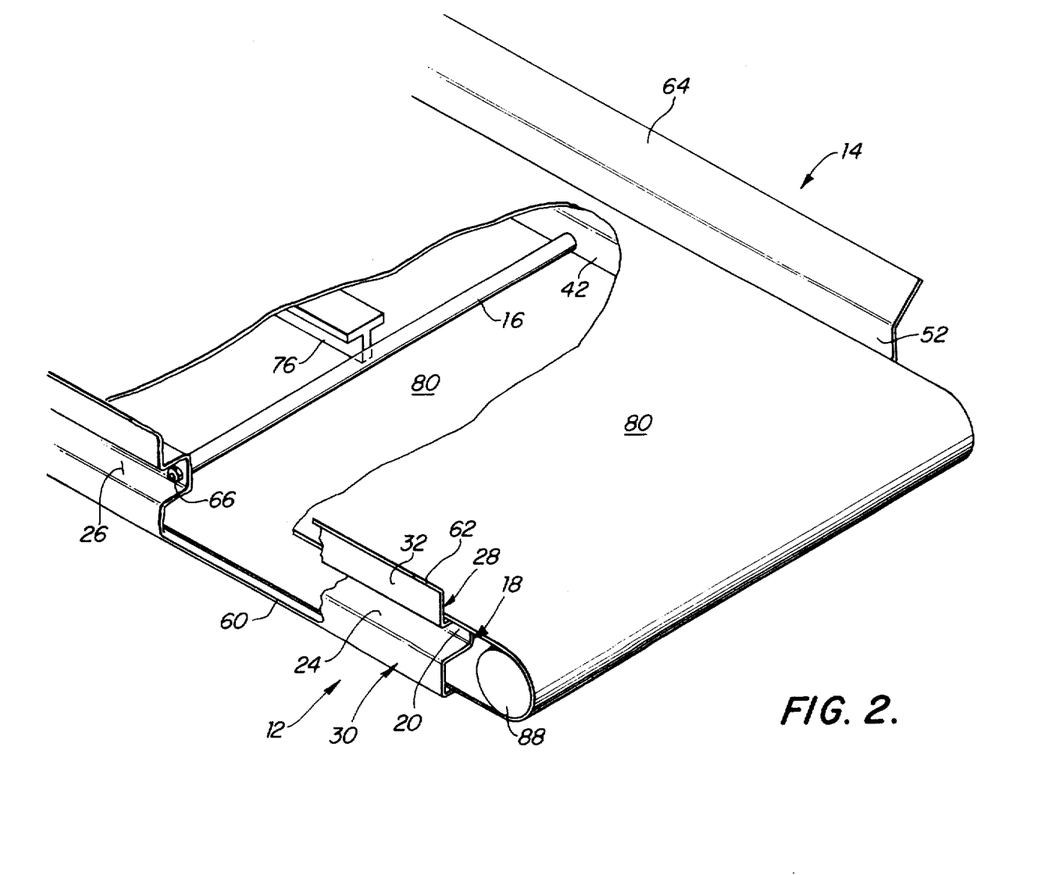
FIG. 2 is an axonometric view of a portion of the conveyor system of FIG. 1 with parts broken away.

There is shown in FIGS. 1 and 2 a dynamic conveyor system 10 according to this invention including a pair of side support members 12 and 14 interconnected by one or more transverse support members 16. Side support member 12 includes positive corrugation 18 including inwardly disposed element 20 and interconnection elements 22 and 24 which together form outwardly concave recess 26. Side support member 12 also includes two negative corrugations 28 and 30. Negative corrugation 28 includes an outwardly disposed element 32 and shares interconnection element 22 with positive corrugation 18 to form a concave recess 34. Similarly negative corrugation 30 includes an outwardly disposed element 36 and shares interconnection element 24 with positive corrugation 18 to provide inwardly concave recess 38.

Similarly side support member 14 includes positive corrugation 40 including inwardly disposed element 42 and interconnection elements 44 and 46 which together form outwardly concave recess 48. Negative corrugations 49 and 50 include outwardly disposed elements 52 and 54 and have interconnection elements 44 and 46, respectively, in common with positive corrugation 40, thereby forming inwardly concave recesses 56 and 58, respectively.

Side support members 12 and 14 may be provided with, or be formed integrally with, bottom cover 60 and each of members 12 and 14 may terminate in flared portions 62 and 64, respectively, as shown to more advantage in FIG. 2. Transverse interconnection member 16 may be a rod or similar type of element and may be secured to members 12 and 14 by means for nuts 66 and 68 which are received on threaded ends 69 and 70 of member 16 which extend through holes 72 and 74 in inwardly disposed elements 20 and 42, respectively. Concave recesses 26 and 48 provide ample room for housing threaded ends 69 and 70 and nuts 66 and 68 within the confines of side support members 12 and 14 so that nothing extends beyond the outer edge of members 12 and 14 beyond the plane of elements 32 and 36 and 52 and 54, respectively. An additional, longitudinal, support means 76 may be welded or otherwise fastened to one or more cross members 16 as shown to better advantage in FIG. 2. In this dynamic conveyor system belting 80 is laterally guided by outwardly disposed elements 32 and 52 along its top run and is laterally guided by outwardly disposed elements 36 and 54 along its return path. Bearing surfaces 82 and 84 on interconnection elements 22 and 44, respectively, slidably support the edges of belting 80 along its upper path while bottom cover 60 supports the edges on the return path. Longitudinal support 76 is provided with a bearing surface 86 for supporting the center of belting 80 along its upper path. Belting 80 reverses direction about end roller 88, FIG. 2, whose support mechanism is not shown.

Figure 3:
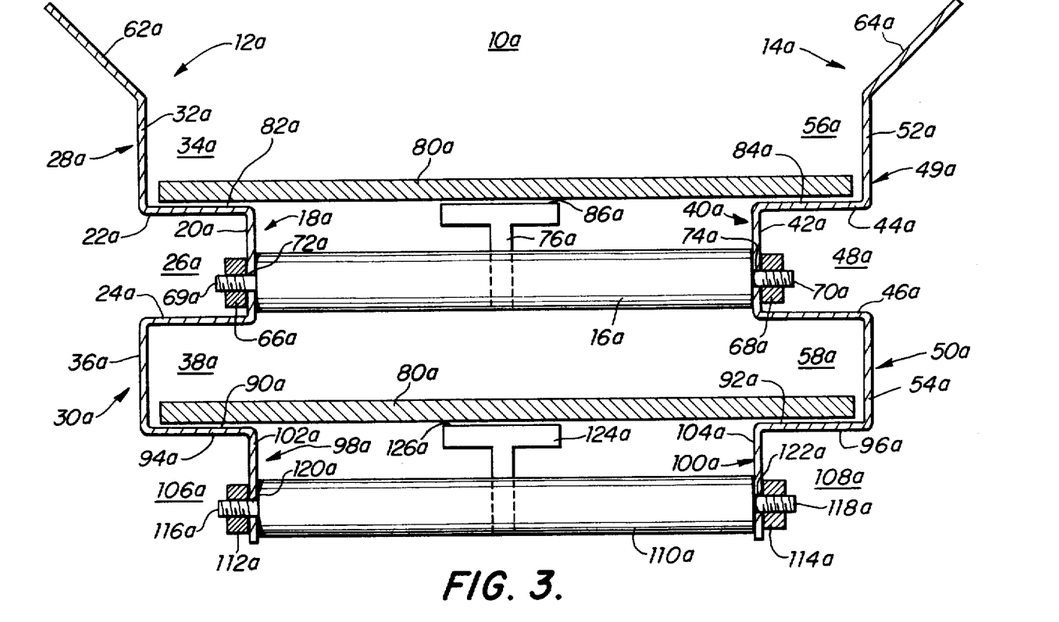
FIG. 3 is a diagrammatic, cross-sectional view of a portion of a dynamic conveyor system similar to that shown in FIG. 1 using a second transverse supporting structure in place of the closed bottom of FIG. 1.
Figure 4:
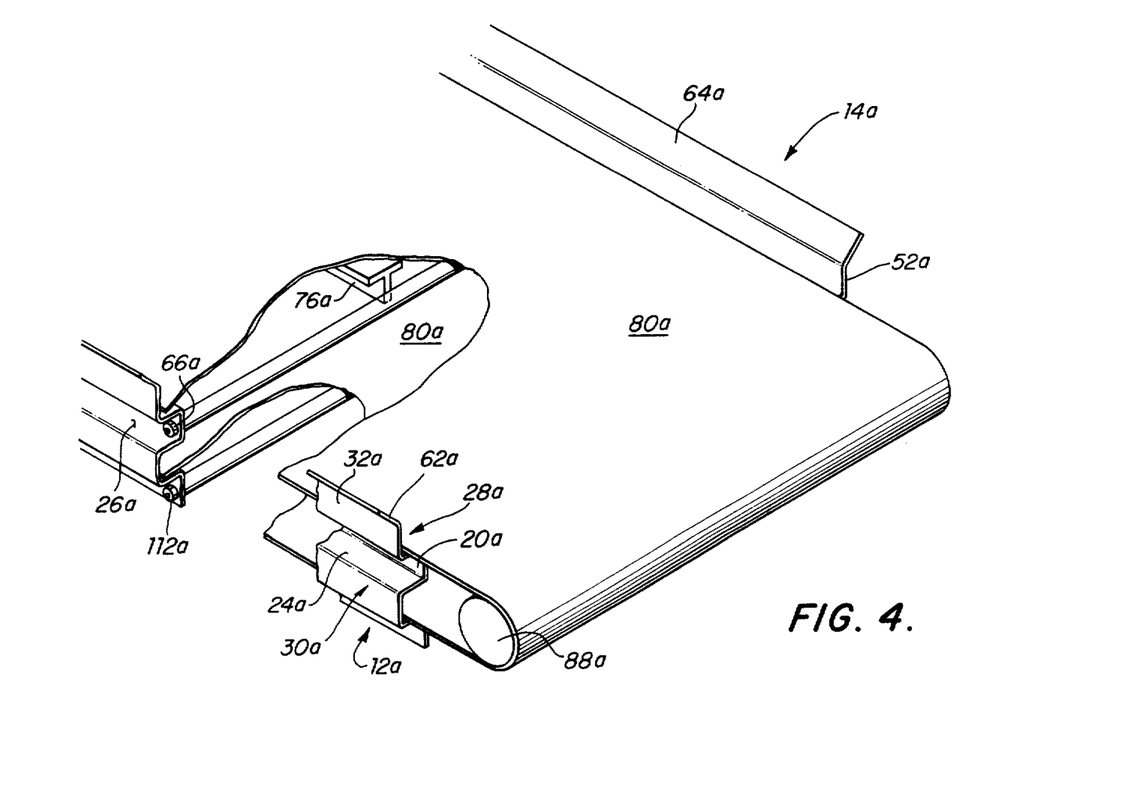
FIG. 4 is an axonometric view of a portion of the conveyor system of FIG. 3 with parts broken away.

Alternatively conveyor system 10 of FIGS. 1 and 2 may be constructed without a bottom cover 60 as shown in FIGS. 3 and 4 where like parts have been given like numbers with respect to FIGS. 1 and 2 and all reference numerals are accompanied by a lower case $a$. In FIGS. 3 and 4 belting 80$a$ on its return lower return path is supported by bearing surfaces 90$a$ and 92$a$ of interconnection elements 94$a$ and 96$a$ which are common to negative corrugations 30$a$ and 50$a$ and their respective adjacent positive corrugations 98$a$ and 100$a$.

Positive corrugations 98$a$ and 100$a$ include inwardly disposed elements 102$a$ and 104$a$, respectively, which together with interconnection elements 94$a$ and 96$a$ form outwardly concave recesses 106$a$ and 108$a$, respectively, which are only partially formed because there is no adjacent negative corrugation and interconnection element. One or more additional transverse support members 110$a$ may be provided mounted in positive corrugations 98$a$ and 100$a$ by means of nuts 112$a$, 114$a$ secured to threaded ends 116$a$, 118$a$, extending through holes 120$a$ and 122$a$ in inwardly disposed elements 102$a$ and 104$a$, all respectively. An additional longitudinal support member 124$a$ with a bearing surface 126$a$ may be used to support the center of belting 80$a$ along its lower return path.

Figure 5:
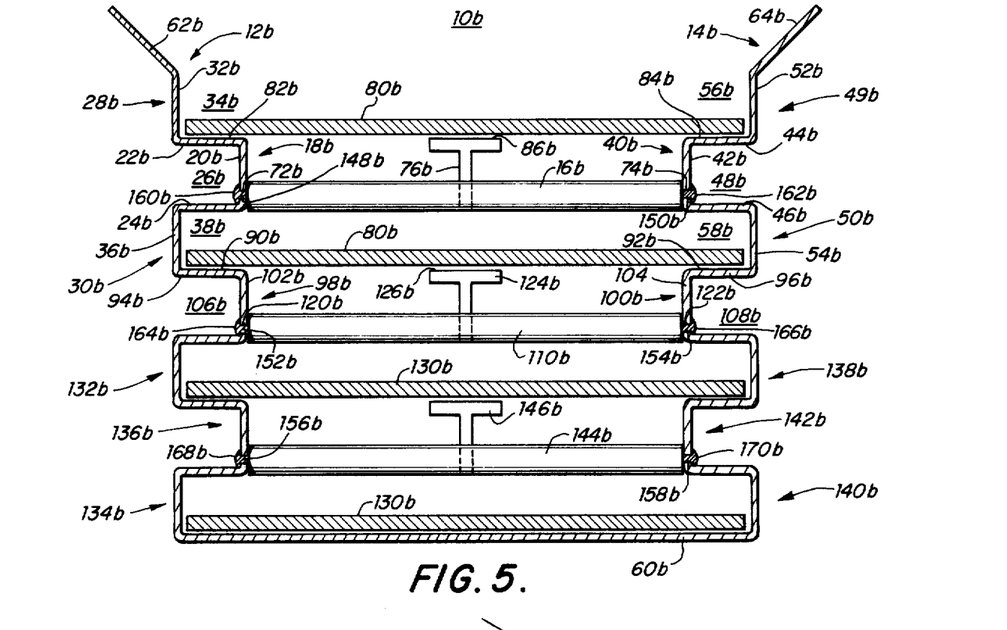
FIG. 5 is a diagrammatic, cross-sectional view of a portion of a dynamic conveyor system similar to that shown in FIG. 1, with two conveyors.
Figure 6:
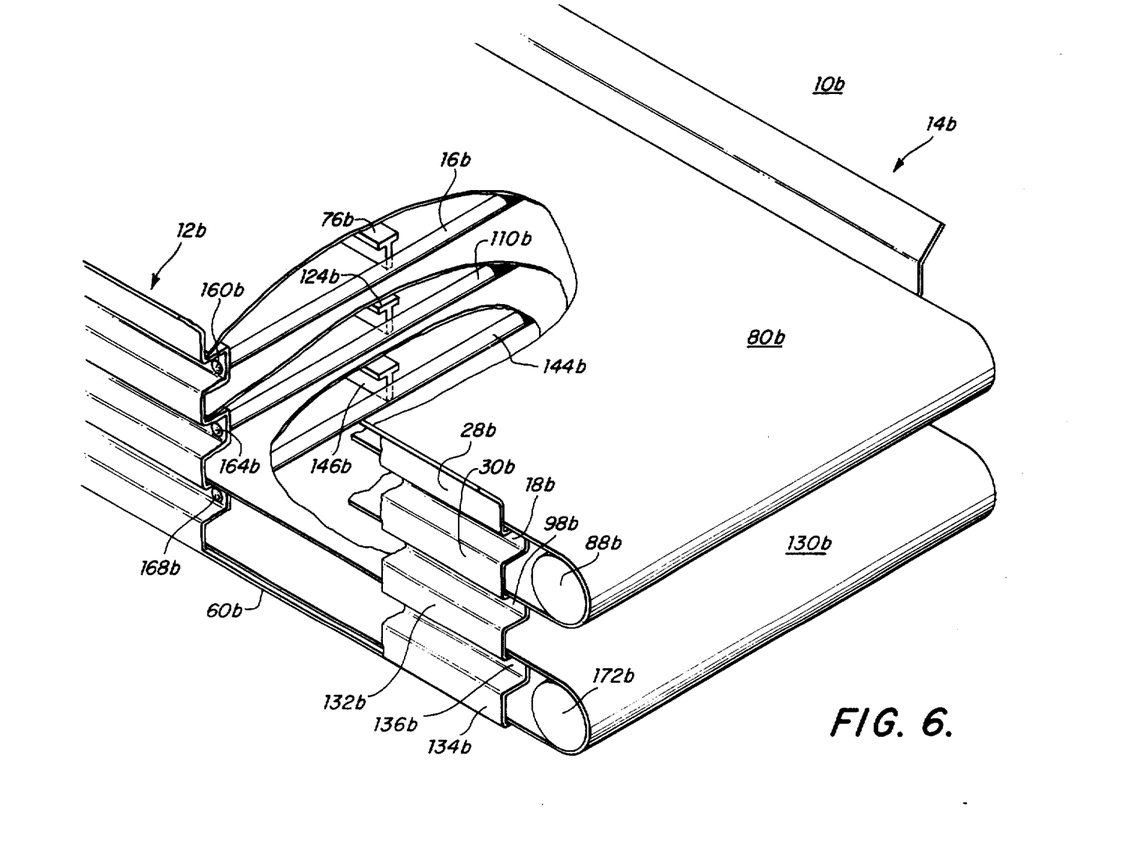
FIG. 6 is an axonometric view of a portion of the conveyor system of FIG. 5 with parts broken away.

Second and subsequent belts may be added to increase the capacity of the conveyor as illustrated in FIGS. 5 and 6 in which like parts have been given like numbers and all reference numerals are accompanied by a lower case $b$. In FIGS. 5 and 6 a second conveyor belt 130$b$ has been added and side support members 12$b$ and 14$b$ are extended to accommodate the new belting 130$b$. Side support member 12$b$ includes additional negative corrugations 132$b$ and 134$b$ and positive corrugation 136$b$, while side support member 140$b$ includes additional negative corrugations 138$b$ and 140$b$ and additional positive corrugation 142$b$. An additional transverse support member 144$b$ and longitudinal support member 146$b$ also are included as is a bottom cover 60$b$. Transverse support members 16$b$, 110$b$ and 144$b$ in FIGS. 5 and 6 are secured to side support members 12$b$ and 14$b$ by having their end shafts 148$b$, 150$b$, 152$b$, 154$b$, 156$b$ and 158$b$ peened over as at 160$b$, 162$b$, 164$b$, 166$b$, 168$b$ and 170$b$, all respectively. Belting 130$b$ reverses direction around roller 172$b$, FIG. 6.

Figure 7:
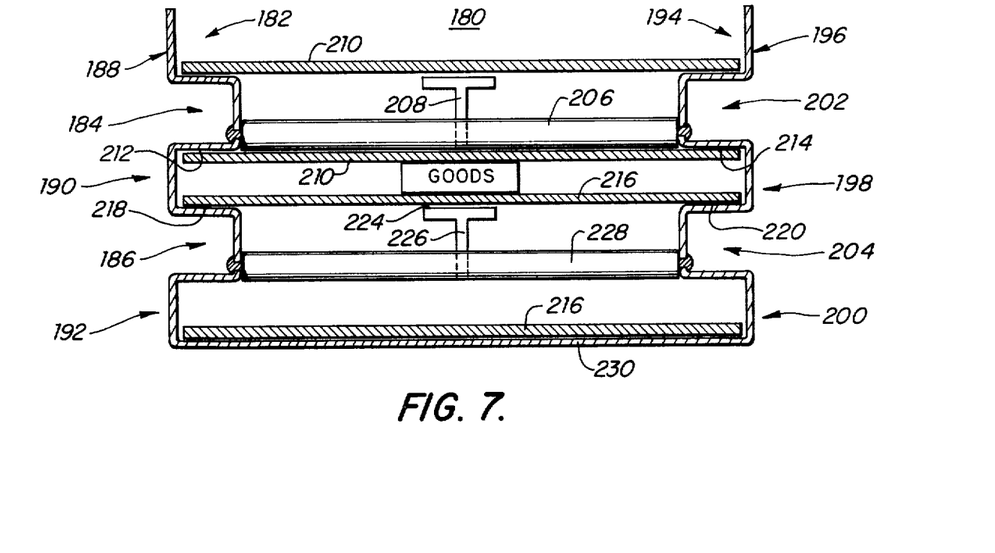
FIG. 7 is a diagrammatic, cross-sectional view of a portion of a dual conveyor hold-down dynamic conveyor system.

A dual conveyor system such as 10$b$, FIGS. 5 and 6, may also be constructed in such a way so that the upper conveyor provides a hold down function as shown in FIG. 7 where hold down conveyor system 180 includes side support member 182 having positive corrugations 184, 186 and negative corrugations 188, 190 and 192. Side support member 194 includes negative corrugations 196, 198 and 200 and positive corrugations 202 and 204. Transverse support member 206 is interconnected between positive corrugations 184 and 202 and supports longitudinal support member 208 which supports the center area of conveyor belting 210. In its lower return path belting 210 slides on bearing surfaces 212 and 214. Second conveyor belting 216 is supported on bearing surfaces 218 and 220 and on bearing surface 224 of longitudinal support member 226 which is supported by transverse support member 228 secured to positive corrugations 186 and 204. On the lower, return path belting 216 is supported on bottom cover 230. The space between the lower return path of belting 210 and the upper path of conveyor 216 is sized so that the GOODS being moved by belting 216 are held down by the lower return path of belting 210.

Figure 8:
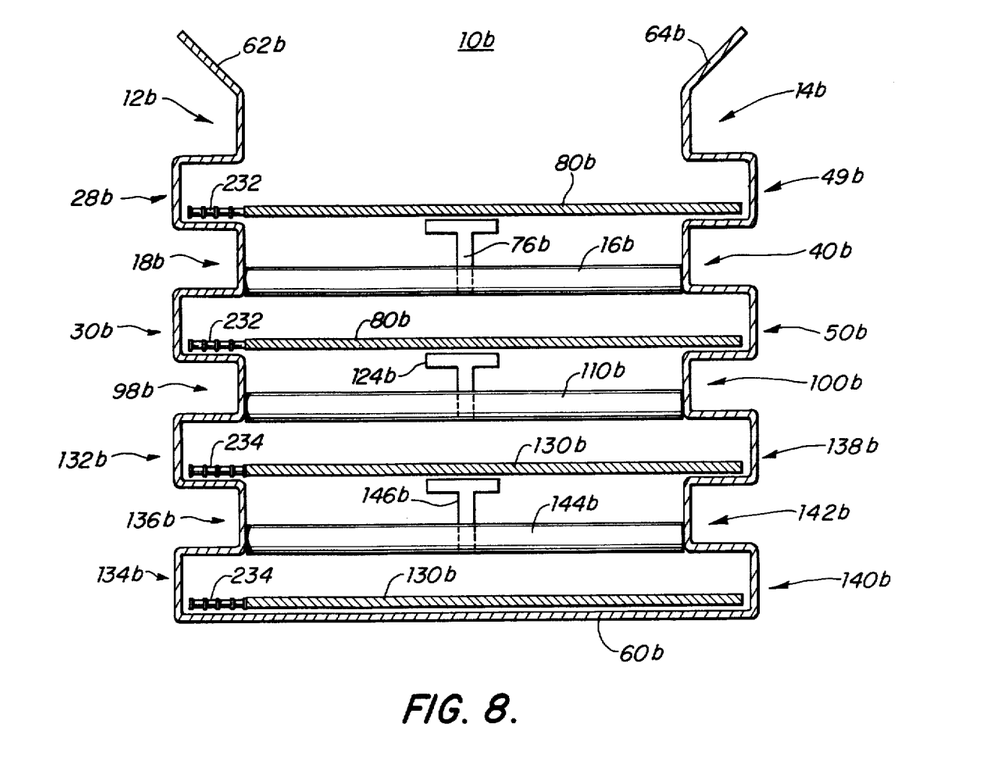
FIG. 8 is a diagrammatic, cross-sectional view of a portion of a conveyor system similar to that shown in FIG. 5 illustrating an internal drive element integral with the belting and an internal drive element separate but interconnected with the belting.
Figure 8A:
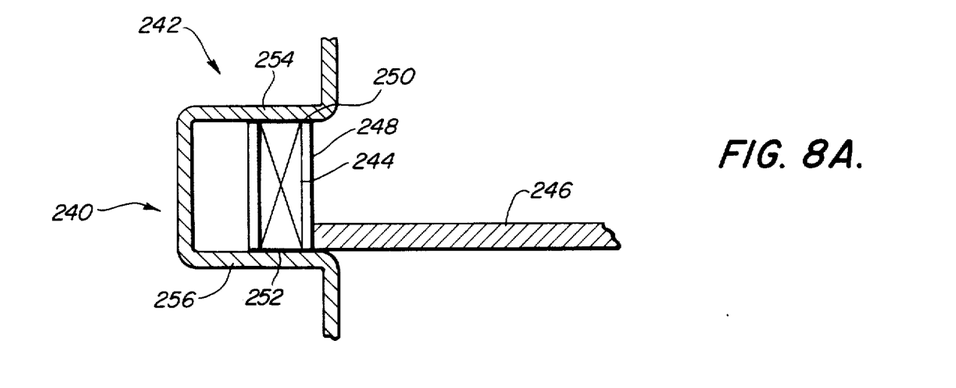
FIG. 8A is a diagrammatic, cross-sectional view of a portion of a system similar to that shown in FIG. 8 in which the drive chain is snugly slidable in a negative corrugation.

In FIGS. 1-7 the various conveyor belting elements are driven by end rollers 88, 88$a$, 88$b$, and 172$b$ but this is not a necessary limitation. For example, in FIG. 8, elements such as chains 232 and 234 may be attached to or made integral with their respective beltings 80$b$ and 130$b$ and be driven by a motor driven sprocket. Alternatively, as shown in FIG. 8A, the negative corrugation 240 of side support member 242 may be sized so that chain 244, either integral with or attached to belting 246, is snugly, slidably received in the inwardly concave recess 248 between bearing surfaces 250 and 252 of interconnection elements 254 and 256.

Figure 9:
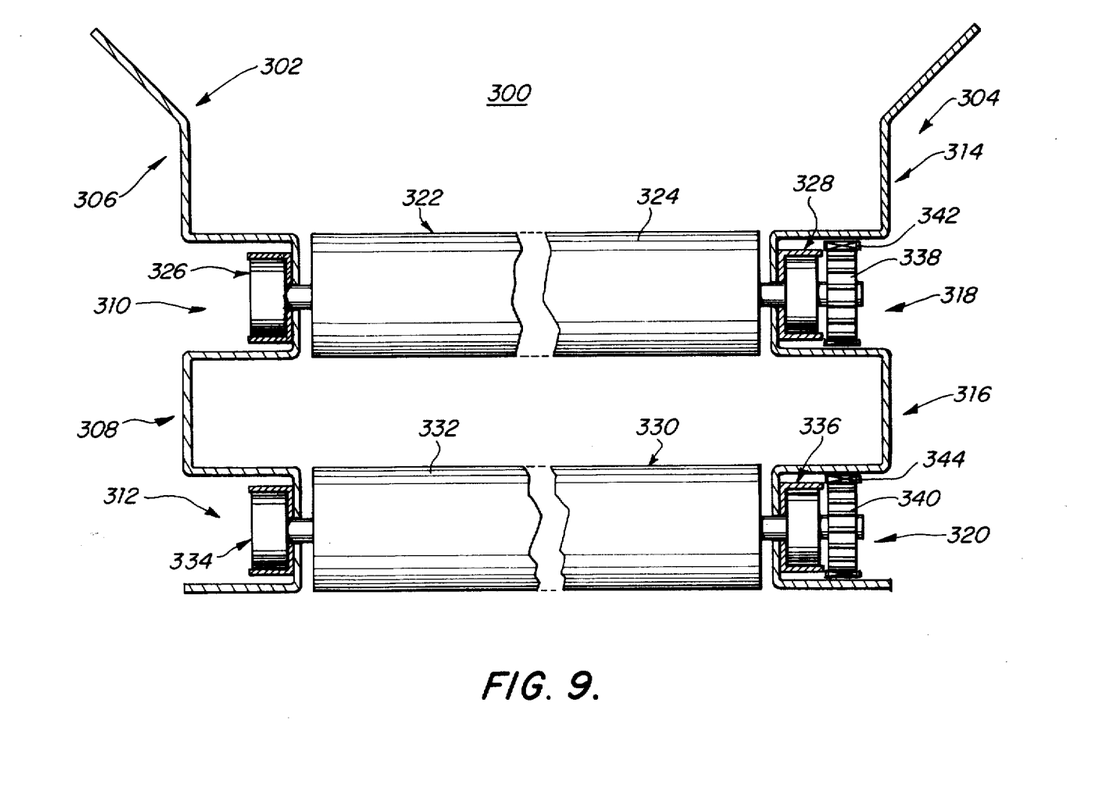
FIG. 9 is a diagrammatic, cross-sectional view of a static conveyor system with external drive elements according to this invention.
Figure 10:
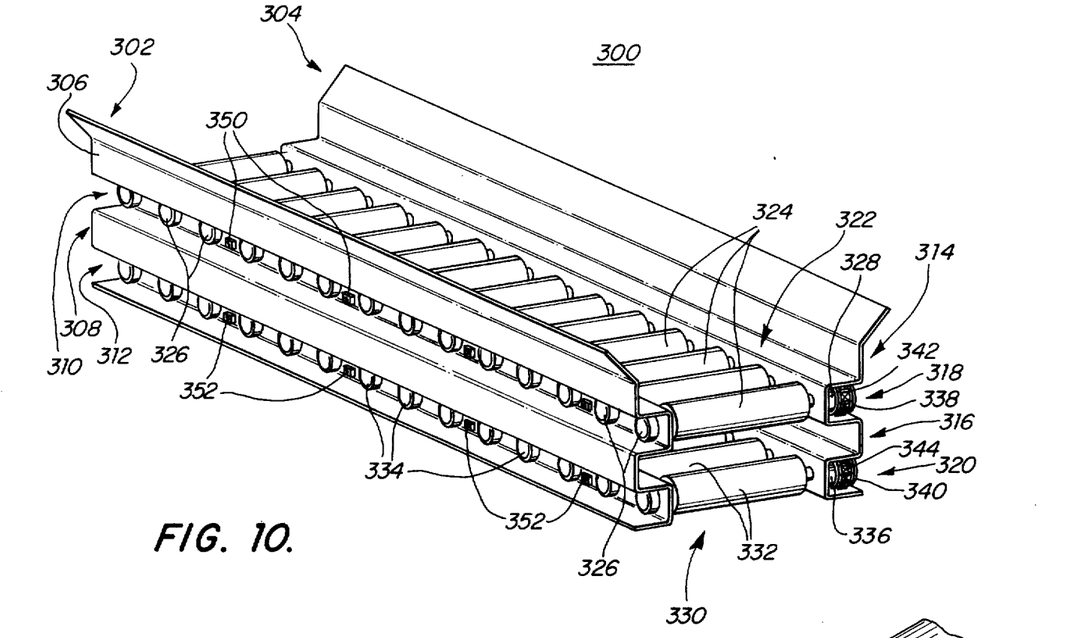
FIG. 10 is an axonometric view of a portion of the conveyor system shown in FIG. 9.

A dual conveyor static conveying system 300, FIGS. 9 and 10, is constructed using side support members 302 and 304. Side support member 302 includes two negative corrugations 306 and 308 and two positive corrugations 310 and 312. Side support member 304 includes negative corrugations 314, 316 and positive corrugations 318 and 320. The first conveyor 322 includes rollers 324 rotatably supported in positive corrugations 310 and 318 by roller bearing assemblies 326 and 328, respectively. A second conveyor 330 includes rollers 332 which are mounted in positive corrugations 312 and 320 by means of rotary bearing assemblies 334 and 336. Drive members such as gears 338 and 340 may be attached to one end of rollers 324 and 332 to be driven by drive elements such as chains 342 and 344, respectively. Transverse support members (not shown) interconnecting side support members 302 and 304 are mounted interstitially of rollers 324 and interstitially of rollers 332 and are mounted in positive corrugations 310, 318 and 312 and 320, respectively, by means of securing means 350 and 352, respectively.

Figure 11:
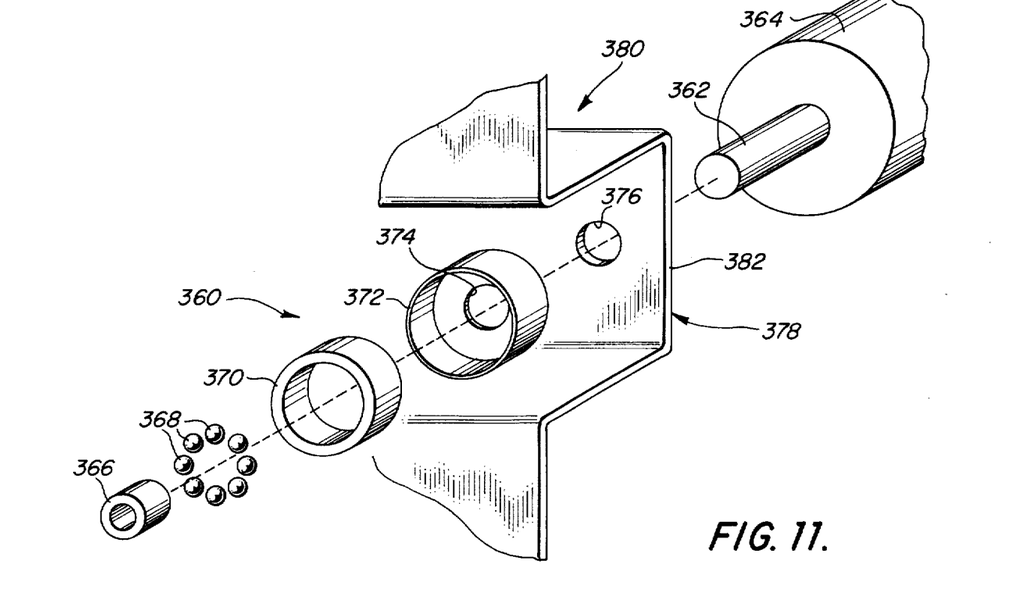
FIG. 11 is an enlarged, exploded, axonometric view of a portion of the conveyor shown in FIG. 10 showing a roller mounting means.

The rotary bearing assembly 360, FIG. 11, typical of assemblies 326 and 328, FIGS. 9 and 10, which is used to mount shaft 362 of roller 364, typical of rollers 324, 332, FIGS. 9 and 10, includes an inner race 366, ball bearings 368, outer race 370 and a cup 372 having an aperture 374 to be aligned with hole 376 in positive corrugation 378 of side support member 380. Cup 372 may be welded or otherwise fixed to the inner surface of inwardly disposed element 382 so that shaft 362 extends into and through aperture 374 in cup 372. Inner race 366 then engages shafts 362 in the usual fashion and is rotatably supported by ball bearings 368 in outer race 370 which is fixed in cup 372.

Figure 12:
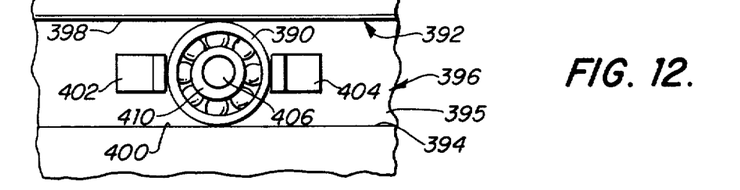
FIG. 12 is an end view of an alternative roller mounting means according to this invention.
Figure 13:
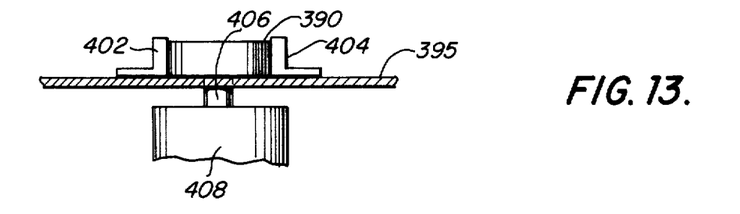
FIG. 13 is a top view of the roller mounting means of FIG. 12.

Alternatively, FIGS. 12 and 13, bearing assembly 390 may be sized to fit between interconnection elements 392, 394 and against inwardly disposed element 395 of positive corrugation 396 so that bearing surfaces 398 and 400 snugly and firmly receive bearing assembly 390 and confine it against motion in that dimension. A pair of detents 402, 404 act to confine bearing assembly 390 in a second dimension transverse to the first. Shaft 406 of roller 408 is force fitted into the inner race 410 of bearing assembly 390.

Figure 14:
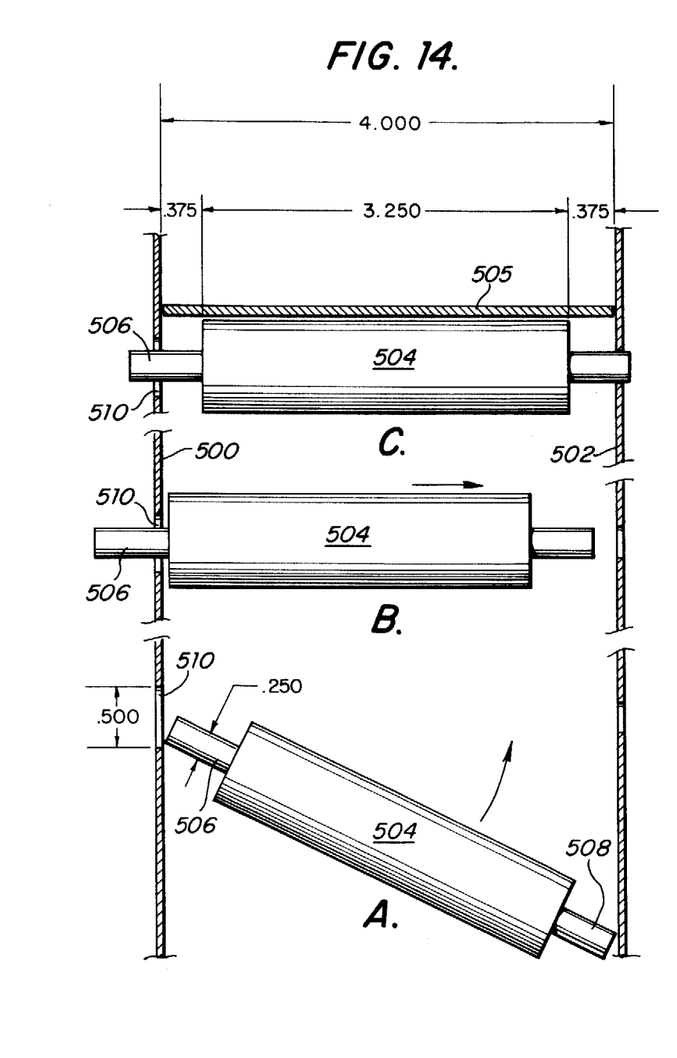
Figure 15:
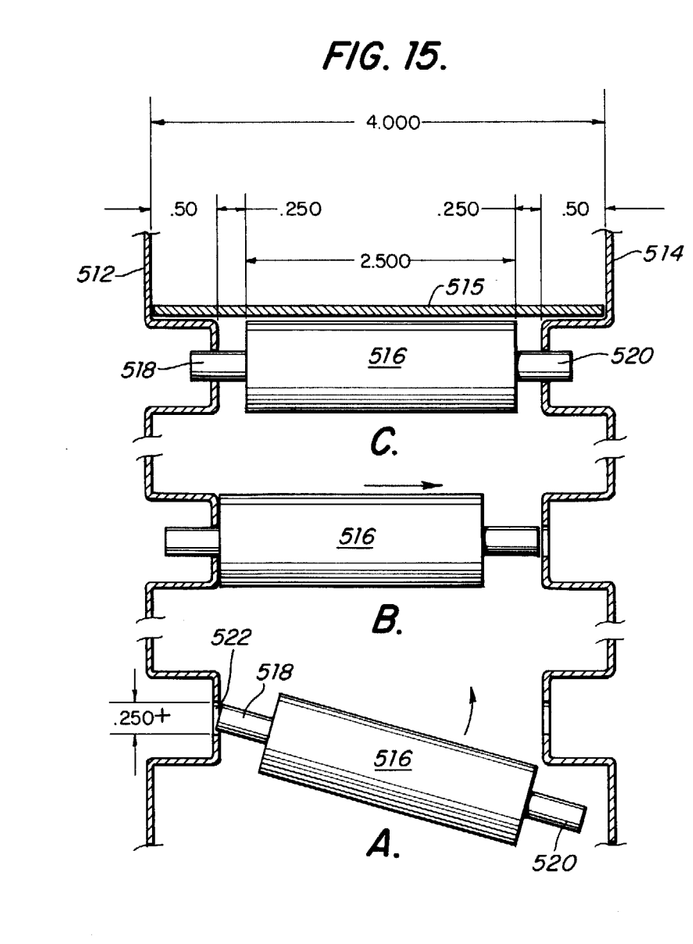

The advantage of the side support member construction of this invention with respect to the ease of insertion of fixed shaft roller, minimizing the size of the mounting hole required and increasing the ratio of the length of the rollers to the space between the side support members may be better understood with reference to FIGS. 14A, B and C and FIGS. 15A, B and C. In FIG. 14 there is shown a conventional conveyor side support structure. It has flat, parallel sides 500 and 502 which are four units apart to accommodate belting 505 of four unit width. Roller 504 has a length of 3.25 units and thus requires end shaft 506, 508 to have the length significantly in excess of 0.375 units. End shafts 506 and 508 have a diameter of 0.25 units. In order to mount roller 504 it is necessary to angle it in the position shown in FIG. 14A. Mounting hole 510 used for the initial insertion must be approximately 0.5 units in diameter or have an elliptical shape with a major axis of at least 0.5 units, in order to allow shaft 506 to be inserted. Roller 504 is then swung to the position shown in FIG. 14B and is then moved to the right to its final position shown in FIG. 14C; only 3.25 units of the belt are supported while the remaining 0.750 units of the belt are unsupported.

In contrast to accommodate the identical four unit width belting 515 using side support members 512 and 514 according to this invention roller 516 may be 2.5 units and have its end shafts 518 and 520 significantly in excess of 0.25 units in length. In the initial insertion position, roller 516, FIG. 15A need be only slightly angled to accommodate its full length because of the extra room provided by the negative corrugations on either side of the positive corrugations in which it is to be mounted. Thus hole 522 need only be slightly larger than the quarter unit diameter of end shaft 518. Then roller 516 may be easily swung to the position shown in FIG. 15B and moved to the right to its final position shown in FIG. 15C after which end bearings or some securing means may be made fast to the ends of shaft 518, 520. In the final position roller 516 supports 2½ units of belting 515 and the bearing surface provided by each interconnection element provides an additional 0.5 units of support so that only a total of 0.5 units of belt remains unsupported. This as compared to 0.75 units of belt which go unsupported in the prior art device, FIG. 14.

Figure 16:
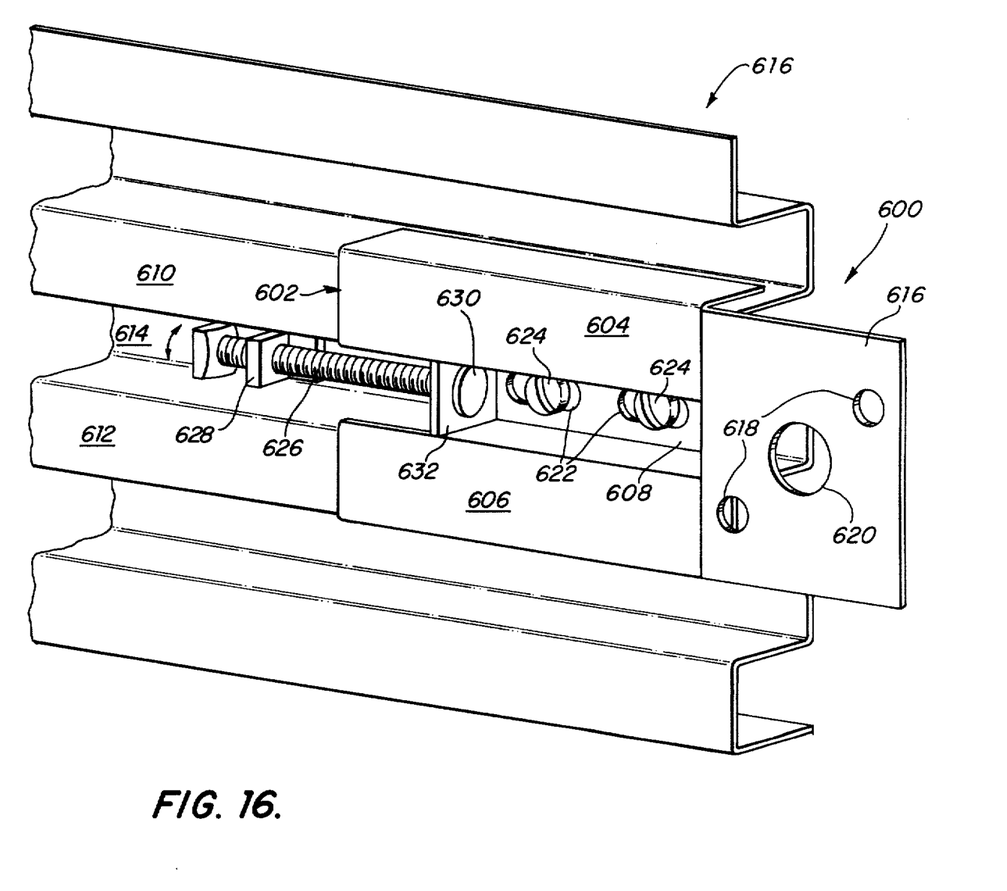
FIG. 16 is a diagrammatic, axonometric view of a portion of a conveyor system showing a tension adjusting means according to this invention.

A tension adjusting device 600 according to this invention is shown in FIG. 16. Tension adjustment device 600 includes a corrugated plate 602 including a pair of negative corrugations 604 and 606 and a positive corrugation 608 which nest respectively with negative corrugations 610, 612 and positive corrugation 614 of side support member 616. Plate 602 includes an extension 616 having screw holes 618 to receive a bearing support for a roller shaft which is received through hole 620. A pair of slots 622 are provided in positive corrugation 608 for accommodating screws 624 which may be used to fix plate 602 in place after it has been adjusted. Adjustment is made by rotating threaded member 626, which is threadably engaged with element 628 fixed to positive corrugation 614 of side support member 616 and which has its end 630 journaled in member 632. Adjustment device 600 is used in combination with a second complementary adjustment mechanism which is mounted to the other side support member of a pair of side support members of a conveyor system.

Other embodiments will occur to those skilled in the art and are within the following claims:

What is claimed is:

1. A conveyor system support structure comprising:
   first and second monolithic, longitudinally corrugated side support members;
   transverse support means, including at least one transverse support member for interconnecting said side support members, each said transverse support member including fastening means at each end for engaging with said side support members;
   each said side support member including at least one positive and one negative corrugation, each said positive corrugation including an inwardly disposed element and interconnection elements in common with adjacent negative corrugations, and each said negative corrugation including an outwardly disposed element and interconnection elements in common with adjacent positive corrugations; and
   a tension adjustment mechanism including a corrugated plate for snugly nesting in, and being slidably guided by said corrugations of a said side support member, a reference member fixed to said side support member and means interconnecting said reference member and plate for adjusting the distance therebetween.

2. A conveyor system support structure comprising:
   first and second monolithic, longitudinally corrugated side support members;
   transverse support means, including at least one transverse support member for interconnecting said side support members, each said transverse support member including fastening means at each end for engaging with said side support members;

roller means including at least one roller, each said roller including securing means at each end for engaging with said side support members;

each said side support member including at least one positive and one negative corrugation, each said positive corrugation including an inwardly disposed element and interconnection elements in common with adjacent negative corrugations, and each said negative corrugation including an outwardly disposed element and interconnection elements in common with adjacent positive corrugations;

each said positive corrugation defining an outwardly concave recess for housing said fastening means and said securing means within said positive corrugation;

an external drive element, said means for securing said roller including a drive member proximate one end of said roller for engaging said external drive element, said outwardly concave recess housing said external drive element within said positive corrugation.

3. A conveyor system support structure comprising:

first and second monolithic, longitudinally corrugated side support members;

transverse support means, including at least one transverse support member for interconnecting said side support members, each said transverse support member including fastening means at each end for engaging with said side support members;

roller means including at least one roller, each said roller including securing means at each end for engaging with said side support members;

each said side support member including at least one positive and one negative corrugation, each said positive corrugation including an inwardly disposed element and interconnection elements in common with adjacent negative corrugations, and each said negative corrugation including an outwardly disposed element and interconnection elements in common with adjacent positive corrugations;

each said positive corrugation defining an outwardly concave recess for housing said fastening means and said securing means within said positive corrugation;

said roller includes a shaft, and said means for securing said roller includes a hole in said inwardly disposed element for receiving said shaft of said roller and a rotary bearing mechanism housed in said outwardly concave recess, and fixed to said inwardly disposed element for receiving said shaft, said interconnection elements defining said outwardly concave recess for snugly and firmly engaging said rotary bearing mechanism and confining it against movement in a first dimension and said inwardly disposed element including a pair of spaced detents for firmly and snugly engaging said rotary bearing mechanism and confining it against movement in a second dimension transverse to the first.

* * * * *